US011919186B1

(12) United States Patent
Cefo

(10) Patent No.: US 11,919,186 B1
(45) Date of Patent: Mar. 5, 2024

(54) RETRACTABLE CUTTER

(71) Applicant: Nevres Cefo, Macedonia, OH (US)

(72) Inventor: Nevres Cefo, Macedonia, OH (US)

( * ) Notice: Subject to any disclaimer, the term of this patent is extended or adjusted under 35 U.S.C. 154(b) by 370 days.

(21) Appl. No.: 17/368,098

(22) Filed: Jul. 6, 2021

Related U.S. Application Data

(60) Provisional application No. 62/705,898, filed on Jul. 21, 2020.

(51) Int. Cl.
*B26B 5/00* (2006.01)
*B26B 1/08* (2006.01)

(52) U.S. Cl.
CPC ................ *B26B 5/003* (2013.01); *B26B 1/08* (2013.01)

(58) Field of Classification Search
None
See application file for complete search history.

(56) References Cited

U.S. PATENT DOCUMENTS 2,722,914 A * 11/1955 Aversa .................. B43K 24/08 30/162
3,885,308 A * 5/1975 Gordin .................. B43K 24/08 30/162
4,337,576 A * 7/1982 Drost ................ A61B 17/3213 30/162
8,943,700 B2 * 2/2015 Cetola ................ A61B 17/3213 30/162
2020/0215703 A1 * 7/2020 Scimone .................. B26B 9/00

* cited by examiner

*Primary Examiner* — Hwei-Siu C Payer

(57) ABSTRACT

A retractable cutter comprises a plunger that can be pressed to an on-position for pushing a thrust device of the cutter to guide a blade via a cam piston cartridge through a blade guide and partially outside a bottom retainer to expose the tip of the blade from a housing of the retractable cutter. In this on-position, a spring mechanism of the retractable cutter is engaged between the bottom retainer and the cam piston cartridge to provide a spring force for preventing the blade from extending any further. When the plunger is pressed to an off-position, the thrust device is positioned in such a way to enable the spring mechanism to rebound to its original position for retracting the blade back into the housing.

6 Claims, 12 Drawing Sheets

RETRACTABLE CUTTER

TECHNICAL FIELD

The present invention relates to a novel tool device, and apparatus for cutting, piercing, penetrating, marking, or otherwise forming a variety of materials with a swift and safe operation. More particularly, the invention relates to a device capable of safely extending its cutting portion from the housing into operating position by applying pressure on a plunge actuator, and then retracting the cutting portion back to its Original safety position by again simply applying pressure on the plunger actuator. Preferably, the invention relates to cutters for opening medication blister packs and otter medical packaging.

BACKGROUND OF THE INVENTION

Small utility knives, box cutters and end blades (hereinafter referred to as box cutters) are used in all areas of life and work and use a variety of knives and blades, e.g., retractable, fixed, folding, pull out, insert molded, replaceable, etc. Such box cutters also have numerous functions, shapes, colors, and materials.

However, the prior and current designs of box cutters require very careful handling related to operation, safety, configuration, and functionality.

Considering the everyday need for quick and safe cutting, piercing, penetrating, marking, or otherwise forming or reshaping of materials, as such, these prior and current designs suffer from drawbacks that hinder quick, practical, and safe usage. Those drawbacks include e.g., the need for two-hand operations, long blades, awkward positioning during use, inability to control the depth of the cut, hand fatigue, unsafe retraction, multiple moving parts, need for frequent maintenance, lubrication and blade replacement, need for sharpening, difficult cleaning of the box cutter parts, etc., resulting in inadequate use of the device or the need for multiple devices with different designs to accommodate the desired function.

The practical and safe usage is especially important when cutters are used by medical personnel to open numerous blister packs and other medication packaging. The medical personnel often need to open many blister packs in a single day.

Therefore, a need exists in the field for a novel box cutter device with safe and quick operation in numerous applications including but not limited to blister packaging cutting, medical pill extraction, box opening, adhesive tape cutting, small area scraping, marking, etc., which is low maintenance, easy to clean up, and small and safe for handling, transportation, and storage.

A further need exists for a box cutter device that accommodates one-hand operations for cutting position or retraction to a safe position.

A still further need exists for a box cutter device with a guide that limits blade extension, thereby enabling operation while minimizing the risk of serious accidental injuries.

A still further need exists for a box cutter device with the capability to be attached to pockets, retractable reels, purses etc.

SUMMARY OF THE INVENTION

A Retractable Cutter of the present invention is a novel design providing secure and safe operation. It is preferably used in a medical field for extraction of the pills and other medications from blister packs, bottles, bags, boxes and variety of additional packaging. Due to a very rigid, cumbersome, and unwieldy packaging of the most pills and other medication, extraction of the pills and other medications is a very difficult and unsafe task. For example, nurses, doctors and medical staff in medical facilities use pens, pencils, standard box cutters, scissors, nails, paper clips, keys, and numerous inadequate items to extract pills and other medication. In most cases, they perform these unsafe operations tens or hundreds of times a day.

The Retractable Cutter of the present invention handles piercing, cutting, and opening of thousands of different medical packaging in medical facilities, home or other places in a more safe and controlled manner. While this cutter is preferably used in a medical industry, it is not limited thereto. It can also be used as a home or office handy cutter for tape, box cutter, paper, fabric, crafts etc.

A Retractable Cutter includes, a blade mechanism, including a Blade 103, a Cam-Piston Cartridge 104, a Friction Element 108, a Thrust Device 109, and a Thrust Tube/Plunger 110. The blade assembly is rotating preferably at 120 degrees around its longitudinal axis (clockwise or counterclockwise) with every push on the Thrust Tube/Plunger 110, engaged through the Thrust Device 109. Rotation is provided by bistable cam mechanism, which can employ e.g., any of three cam subsystems; (a) a cam system as an integral part of an actuator cylinder 107, (b) a cam system as an integral part of a Thrust Device 109, and (c) a cam system as an integral part of the Thrust Tube/Plunger 110. When the Thrust Tube/Plunger 110 is pressed, the cam system moves from the OFF position to the ON position, compressing the spring, and storing potential energy for moving the cam system back to the OFF position with the next pressing of the Thrust Tube/I Plunge Plunger 110. By piercing and cutting different materials during operation (e.g. paper, cardboard, plastic, foam . . . ) an orifice of the Bottom Retainer 102 may get clogged with debris, shaving and other undesirable particles. This 120 degree rotation of the blade assembly ensures a clean orifice of the Bottom Retainer 102 due to a minimum clearance between the Blade 103 and the orifice of the Bottom Retainer 102.

Alternative rotation angles can also be employed. For example, by modifying the bistable cam system, different rotation angles can be achieved (e.g., 45°, 60°, 90°, and 180°).

It is also possible to use a twist mechanism to replace a Friction Element 108, Thrust Device 109, and Thrust Tube/Plunger 110. The twist mechanism may require additional processing of the Cam-Piston Cartridge 104 by knurling, grooving or other shaping to accommodate a twist motion of the twist insert. The twist mechanism is usually located between the Lower Piston Casing 106 and the Actuation Cylinder 107 so that when an operator twists the Actuation Cylinder 107, the blade is protruded, and when the operator twists back the actuation cylinder 107, the blade is retracted. There may be stoppers in place to ensure the Actuation Cylinder 107 does not twist beyond the intended point (e.g., to prevent turning all the way around).

Precise linear movement of the blade assembly is ensured with a three-point slip contact; (a) a slip contact between the Blade 103 and the blade guide 101, (b) a slip contact between the Cam-Piston Cartridge 104 and the Lower Piston Casing 106, and (c) a slip contact between the Thrust Device 109 and the Actuation Cylinder 107. Precise linear movement of the blade assembly is necessary to prolong sharpness of the blade and prevent breakage due to twisting, bending and otherwise misguiding of the blade assembly.

The Cam-Piston Cartridge 104 is made of rigid materials and capable of resisting friction wear. If needed, it is possible to increase a number of the slip contact points between the Cam-Piston Cartridge 104 and the Lower Piston Casing 106 by having more than one protrusion 512 (FIG. 5). This will further stabilize the linear movement with minimum radial tolerance. The similar stabilization can be achieved by multiple slip contacts on the bottom retainer 515 (FIG. 5). A preferred design for the blade assembly is a two-parts insert molding, consisting of the metal Blade 103 with anchors and Cam-Piston Cartridge 104. In other designs, this assembly can be replaced by solid metal, metal or plastic tubes, ceramic, glass, solid plastic, and other adequate materials with or without coating.

The Blade 103—Cam-Piston Cartridge 104 assembly is designed to be replaced if needed or to be removed from the casing in order to sharpen/replace the blade. In addition, the Blade 103, Cam-Piston Cartridge 104 and Thrust Device 109 can be integrated into one part as shown in FIG. 8 of the assembly 800.

Housing preferably includes a Bottom Retainer 102 with a Blade Guide 101, a Lower Piston Casing 106, an Actuation Cylinder 107 and a Top Retainer 111. The housing is designed to accommodate all necessary slip contact points with minimum tolerance and minimum wear. The Bottom Retainer 102, a Lower Piston Casing 106, an Actuation Cylinder 107 and a Top Retainer 111 are connected with threaded male/female connections. A Blade Guide 101 is inserted into the Bottom Retainer 102 and held in place by the Spring Mechanism 105 in a fully assembled housing. Unscrewing the Actuation Cylinder 107 from the Lower Piston Casing 106 will provide an easy access to the Blade 103 and Cam-Piston Cartridge 104 assembly. Unscrewing the Top Retainer 111 from the Actuation Cylinder 107 provides an easy access to the Friction Element 108, Thrust Device 109 and Thrust Tube/Plunger 110.

A spring used in the Spring Mechanism 105 is preferably a compression spring, also known as coil or helical spring. When the Thrust Tube/Plunger 110 is pressed to the ON position, the Thrust Device 109 is pushed and the Blade 103 is guided via a Cam Piston Cartridge 104 through the Blade Guide 101 and partially outside the Bottom Retainer 102, thereby exposing the tip of the Blade 103 from the housing. In this ON position, the Spring Mechanism 105 is engaged between the Bottom Retainer 102 and the Cam-Piston Cartridge 104 to provide a spring force that prevents the Blade 103 from extending any further. When the Thrust Tube/Plunger 110 is pressed to the OFF position, the thrust mechanism 109 is positioned in such a way to enable the Spring Mechanism 105 to rebound to its original position, and the Blade 103 retracts back into the housing. The rebound force of the spring can be regulated by selecting different spring materials, length, number of loops, diameter, etc. While utilizing the spring is a preferred design, other materials with spring characteristics can be used, including spring tempered stampings, rubber, gas cylinders, magnets, etc.

BRIEF DESCRIPTION OF THE DRAWINGS

The embodiments of the present invention are illustrated as exemplary, and are not limited by the figures of the accompanying drawings.

DETAILED DESCRIPTION OF THE PREFERRED EMBODIMENTS

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Different embodiments of a novel Retractable Cutter apparatus for cutting, piercing, penetrating, marking, or otherwise perforating a variety of materials with a swift and safe operation are discussed herein. In the following description, for purposes of explanation, numerous specific details are set forth in order to provide a thorough understanding of the present invention.

The present disclosure is to be considered as an exemplification of the invention, and is not intended to limit the invention to the specific embodiments illustrated by the figures or description below.

The present invention will now be described by referencing the appended figures representing preferred embodiments.

Figure 1:
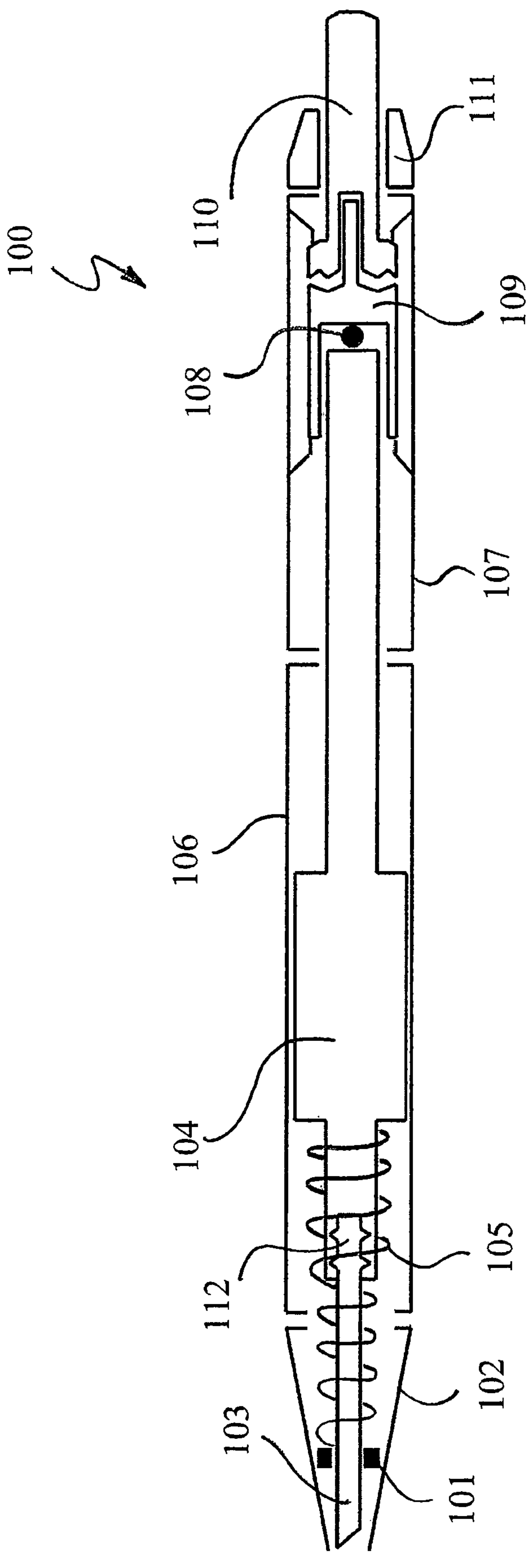
FIG. 1 shows a preferred embodiment of a Retractable Cutter 100 in non-actuated (OFF) position.

Referring to FIG. 1, a preferred embodiment of a Retractable Cutter 100 is shown. It illustrates an assembly view of one example of a Retractable Cutter device in a non-actuated (OFF) position according to the present invention. In particular, it is an assembled longitudinal sectional view of the housing (102, 106, 107, 111), blade assembly (103, 104, 108, 109 and 110), and a Spring Mechanism 105.

A blade assembly includes a Blade 103, a Cam-Piston Cartridge 104, a Friction Element 108, a Thrust Device 109, and a Thrust Tube/Plunger 110; a housing, includes a Bottom Retainer 102 with a Blade Guide 101 inserted to a fix location inside retainer 102, a Lower Piston Casing 106, an Actuation Cylinder 107 and a Top Retainer 111; and a Spring Mechanism 105 in a non-compressed state.

In this preferred embodiment, the Blade 103 is made of high-quality tempered carbon steel. Alternatively, the blade can be made of fatigue resistant spring tempered stainless steel or other adequate metals or cutting materials such as carbon steel, high speed steel (HSS), cast cobalt alloys, coatings on different materials, cermet, ceramic, alumina, silicon nitride, cubic boron nitrite, ceramic tips, tungsten carbide, titanium carbide, carbide tips, glass, diamond, diamond tipped materials, hard plastic, fiberglass, graphite, and other composite materials.

Preferred blade dimensions are: Length=0.800", Width=0.087", Thickness=0.020". These dimensions can differ to accommodate different casings. Preferred dimensional ranges for the blade include: thickness between 0.015" and 0.035" this will give the blade adequate rigidity and manufacturability for automated sharpening; length: from 0.500" to the entire length of the casing; width from 0.050" to the size of the opening of the bottom retainer)—a larger blade width may increase performance when piercing and cutting thicker materials.

A preferred blade cutting angle is 45°. However, the blade cutting angle may range from 25°-65° considering that smaller angles are more adequate for piercing and cutting shorter cuts with small radius curvatures (e.g. pill blister packs, pill bottles, plastic ties, tapes, bandages, small plastic or paper bags, etc.) and greater angles are suitable for longer and straighter cuts (e.g. plastic bags, medical packaging, boxes, etc.).

The Blade 103 is affixed to the Cam-Piston Cartridge 104. Preferably, Blade 103 is insert-molded to the plastic Cam-Piston Cartridge 104. Other means of anchoring the Blade 103 to the Cam-Piston Cartridge 104 include riveting, welding, plastic welding, gluing, compression bonding, press fit, UV bonding, screwing, mechanical rivets, bolts, threaded inserts, self-clinching fasteners, adhesive bonding, and other available methods. This can be accomplished with numerous methods such as: machining, insert molding, rotary casting, 3D printing, stamping, molding, cutting, laser cutting, CNC turning, Wire EDM machining, plating, and other available techniques. For plastic design, preferred methods are 3D printing, multi cavity molding, injection molding, transfer molding, plastic bonding, insert molding, rotary molding and other techniques. For metal design, composites, fiberglass, glass, and carbide, preferred manufacturing processes are machining, grinding, casting, molding, rotary casting, stamping, and casting power metal.

Preferably, Blade 103 has two protrusions 112 on each side of the dull end opposite to the cutting edge, for adequate anchoring to the Cam-Piston Cartridge 104 during insert molding process. Protrusions are preferably triangular in shape with 0.020" sides. Dependent on design, the number of the anchoring protrusions can vary from 1 to 10. Protrusions can be replaced with holes on the body of the blade or other means of anchoring to the Cam-Piston Cartridge 104. Also, Blade 103 can be insert-molded without any anchoring elements with a proper surface preparation such as knurling, threading, sand blasting, etching etc. Blade 103 connection to the Cam-Piston Cartridge 104 can be accomplished by other means, e.g., glued, welded, fastened with fasteners known in the art, etc.

Preferably, Cam-Piston Cartridge 104 is made of Acetal Resin with overall length of 2.826", allowing blade 103 exposure of 0.300". Overall length range can be from 2.000" to 5.000" depending on casing design and material.

Blade protraction from Blade 103 and Cam-Piston Cartridge 104 assembly can be in a range from 0.100" to 1.000", depending on the casing design and materials used. It can be also made of metal, ceramic, plastic, plastic tubing, brass, brass tubing, glass, fiberglass, wood, and other suitable materials. All above designs can be made by a variety of manufacturing processes and procedures including turning, stamping, injection molding, powder metal casting, 3D printing, cutting, forging, transfer molding, welding, etc. Cam-Piston Cartridge 104 largest outside diameter is 0.190 inches allowing close sliding contact with the lower piston's casing 106 inside diameter. This sliding contact points between Cam-Piston Cartridge 104 and Lower Piston Casing 106, and Blade 103 and Blade Guide 101, provide a linear stability of the Blade 103 and Cam-Piston Cartridge 104 assembly during upward and downward motion.

Preferably, Cam-Piston Cartridge 104 has a lower recessed portion with outside diameter (OD) of 0.100" and length of 0.700" to support and allow free contraction and expansion of the Spring Mechanism 105. Cam-Piston Cartridge 104 has an upper recessed portion with OD of 0.135" and length of 0.437". A preferred OD of 0.135" accommodates press fit to the Thrust Device 109.

Blade Guide 101 is a metal carbon steel washer with outside diameter of 0.250" and inside diameter of 0.110" to accommodate blade width allowing free linear and rotational movement of the blade. Blade Guide can be made of different materials or it can be integrated with the Bottom Retainer 102. The range of an inside diameter (ID) of the Blade Guide 101 depends on the width of the Blade 103 and it can range from to 0.300". A preferred material for the Blade Guide 101 is carbon steel zinc plated, but other materials will be suitable such as plastic, stainless steel, ceramic, fiberglass, bearings, brass, aluminum etc.

Non-compressed Spring Mechanism 105 on FIG. 1 is retained between the Blade Guide 101 and the recessed lower edge of the Cam-Piston Cartridge 104. A preferred material for the Spring Mechanism 105 is tempered carbon steel, but other materials can used such as; plastic, stainless steel, rubber, magnets and any other material which can store potential energy by applying compression pressure and release energy by releasing pressure. The preferred spring dimensions are: Length=0.820", OD=0.168", ID=0.142" and Wire thickness=0.013", A preferred Number of coils is 10. The dimension range of the non-compressed Spring Mechanism 105 depends on (1) a design of the cutter; (2) the materials used for the non-compressed Spring Mechanism 106 and (3) a desired compression pressure. It can range: Length=0.100" to 2.000", OD=0.050" to 0.300", ID=0.050" to 0.280", Wire thickness=0.010" to the number of coils preferably range from 2 to 30.

In addition to the press fit, firm contact between Thrust Device 109 and Cam-Piston Cartridge 104 is further provided by Friction Element 108, made of rubber, plastic, glue or other materials which can provide friction necessary to provide rotational movement of the blade along its longitudinal axis providing continues cleaning of the opening of the Bottom Retainer 102. Friction Element 108 can be eliminated by gluing or permanently attaching Thrust Device 109, to Blade 103 and Cam-Piston Cartridge 104 assembly or by other means. Friction Element 108 can be eliminated by press fit contact between Cam-Piston Cartridge 104 and Thrust Device 109.

Rotational and upward and downward movements are provided by simultaneous action of Thrust Device 109, Thrust Tube/Plunger 110, Actuation Cylinder 107, and Spring Mechanism 105.

The thrust device 109 has one or more cam protrusions for the radial movement in slip contact with one or more cam protrusions of the Actuation Cylinder 107. Preferably, the thrust device 109 has a bottom opening of ID=0.139", and depth of the opening of 0.447". The range for the bottom opening can be from 0.050" to 0.300", depending on the design of the casing and materials used. The range for the depth of the opening can be between 0.050" through 1.000" depending on the casing design and materials used. In a preferred embodiment, the thrust device is made of plastic, but other materials can be used, such as metal, fiberglass, powder molded parts, 3D modeled parts, castings, glass, ceramic and other wear resistant materials.

The thrust device 109, thrust tube/plunger 110, and actuation cylinder 107 are also preferably made of plastic, but other materials can be used, such as fiberglass, glass, aluminum, bronze, copper alloys, stainless steel, brass, and other metals. The actuation cylinder 107 has inner protrusion cams providing 1200 Blade 103 and Cam-Piston Cartridge 104 assembly rotations with every push ON/OFF cycle on the Thrust Tube/Plunger 110, engaged through the Thrust Device 109. By changing the number of inner protrusions in the Actuation Cylinder 107, the number of protrusions and cam design on the Thrust Device 109 and Thrust Tube/Plunge 110, and Cam-Piston Cartridge 104, the degree of rotation per click can be modified to 30°, 45°, 60°, and 180°.

Casing Elements

Preferably, the Retractable Cutter is assembled by connecting the Bottom Retainer 102, Lower Piston Casing 106, Actuation Cylinder 107, and Top Retainer 111, by screwing the threaded portions of the parts over the already inserted Blade 103 and Cam-Piston Cartridge 104 assembly, as well as the ON/OFF actuation elements (105, 107, 108, 109, 110).

The Bottom Retainer 102 and Top Retainer 111 preferably have female threads allowing firm connection to the Lower Piston Casing 106 and Actuation Cylinder 107. The Bottom Retainer 102 and Top Retainer 111 are made of moldable plastic with or without coating. Other materials can be used such as metals, ceramics, glass, fiberglass, etc.

The lower Piston Case 106 preferably has male threads on the both sides allowing firm connection to the Bottom Retainer 102 and Actuation Cylinder 107.

The Actuation Cylinder 107 preferably has female threads on the lower side engaging the Lower Piston Casing 106, and male threads on the upper side engaging the Top retainer 111. The Top Retainer 111 can have additional protrusions, hooks, or other attachments in order to enable the Retractable Cutter 100 for attachment to other objects, such as pockets, books, folders, desks, instruments etc.

The casing elements can alternatively be connected by other means e.g. gluing, press fit, etc.

While a single piece design and preferred materials for elements have been described, the device is not limited by that approach or these materials. Wood, plastics, rubber, foam, metal alloys, aluminum, and other materials may comprise some or all of the elements of the Retractable Cutter.

Figure 2:
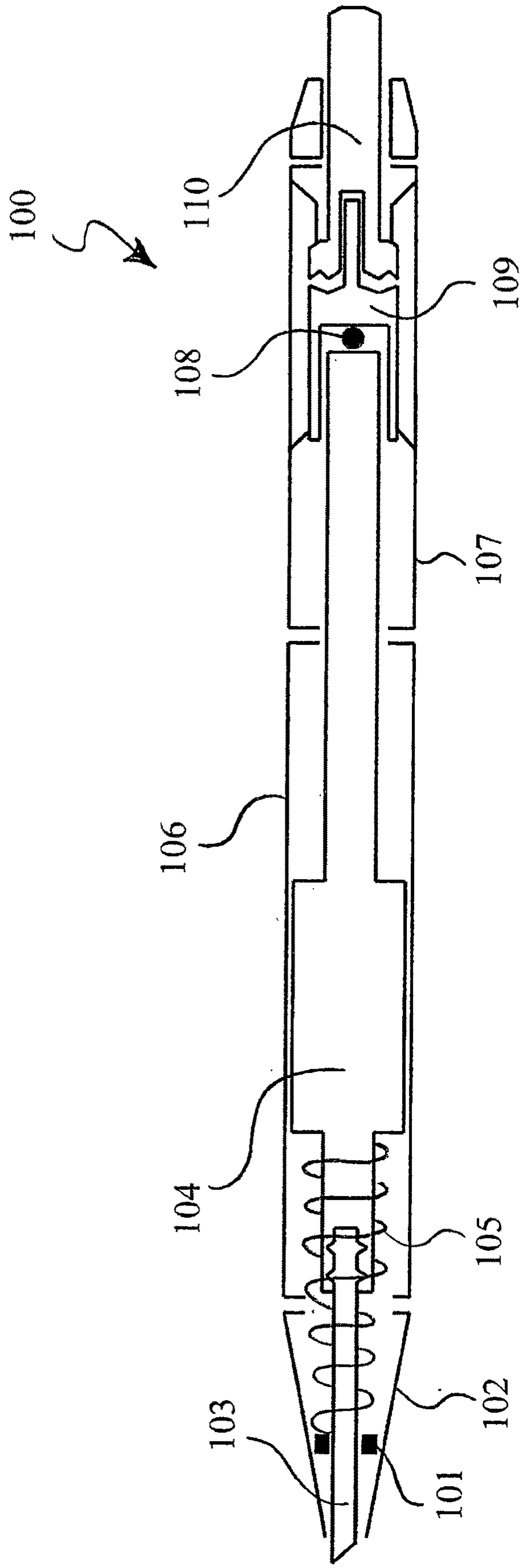
FIG. 2 shows a Retractable Cutter 100 in actuated (ON) position.

FIG. 2 shows the Retractable Cutter 100 in an actuated (ON) position. When the Thrust Tube/Plunger 110 is pressed fully downward from a non-actuated (OFF) position, the Cam-Piston Cartridge 104 and Blade 103 (as part of the blade piston assembly) is moved downward, exposing the tip of the blade out of the Bottom Retainer 102. The tip preferably protrudes around 0.300". When pressure on the Thrust Tube/Plunger 110 is released, the blade piston assembly will settle into the firm position, exposing the tip of the blade, preferably 0.150" outside of the Bottom Retainer 102. This firm positioning is accomplished by the cam design of the inner protrusions of the Actuation Cylinder 107. The range of the exposed tip of the blade out of the Bottom Retainer 102 can be between 0.010" and 0.500", depending on blade thickness, design, and materials used. In the actuated (ON) position, the Spring Mechanism 1 is compressed, retaining potential energy needed for upward movement of the blade piston assembly to the non-actuated (OFF) position. By fully pressing the Thrust Tube/Plunger 110 when the Retractable Cutter 100 is in the actuated (ON) position, the blade piston assembly will move briefly downward and after the Thrust Tube/Plunger 110 is released, the blade piston assembly will settle into a full non-actuated (OFF) position, retracting the tip of the blade to the safe and secure position inside of the casing. This is accomplished by cam design of the inner protrusions of the Actuation Cylinder 107. During the transition from the ON to the OFF position, the Thrust Device 109, through the Friction Element 108, provides radial movement of the blade piston assembly, preferably 600 each time when the thrust device is pressed or released, effectively making 1200 per cycle. Slip contacts between the Blade Guide 101, Blade 103, Lower Piston Casing 106 and Cam-Piston Cartridge 104, provide precise linear movement of the blade piston assembly, ensuring blade stability and minimal friction wearing of the Blade 103 and Cam-Piston Cartridge 104. Slip contacts between the Thrust Device 109 and Thrust/Tube/Plunger 110 ensure low friction radial movement of the Blade 103 and Cam-Piston Cartridge 104 assembly.

Figure 3:
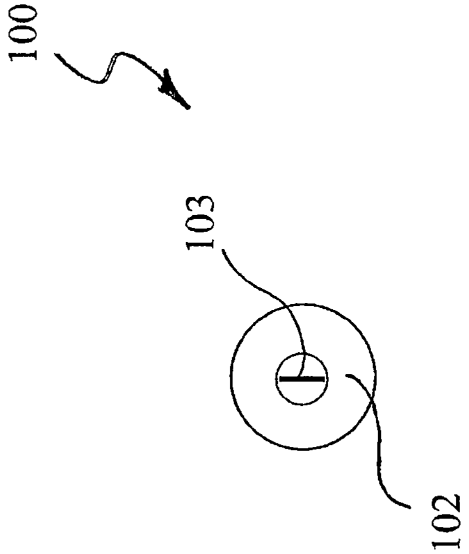
FIG. 3 shows bottom view of actuated and non-actuated Retractable Cutter 100 as one example of various embodiments of the present invention.

FIG. 3 shows the bottom view of the Retractable Cutter 100 as one example of various embodiments of the present invention. The Blade 103 *s* positioned within smaller and non-threaded orifice of the Bottom Retainer 102. During the Retractable Cutter 100 operation from non-actuated to actuated position and vice versa, this close clearance but no-contact positioning between the Blade 103 and orifice ensures clean radial and linear movement of the Blade 103 without jamming. Preferable clearance between the Blade 103 and the smaller orifice of the Bottom Retainer 102 is preferably 0.005". This safeguard against clog or accumulation of any debris during cutting (paper, plastic, threads, glue etc.). This is accomplished by simultaneous linear and radial movements of the Blade 103 during the ON/OFF operation of the Retractable Cutter 100. The range of clearance between the Blade 103 and Bottom Retainer 102 can be between 0.002" to 0.010".

Figure 4:
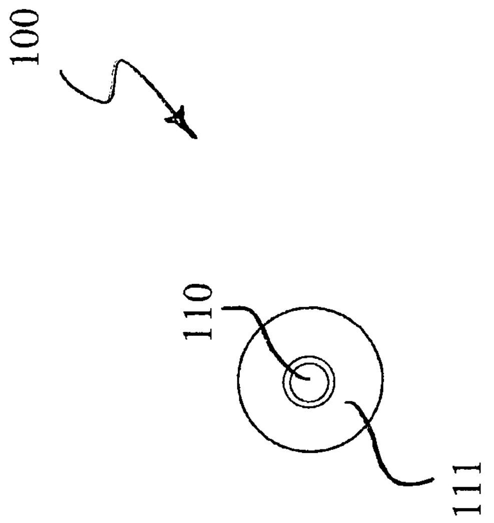
FIG. 4 shows a top view of actuated and non-actuated position of Retractable Cutter 100 as one example of various embodiments of the present invention.

FIG. 4 shows a top view of the actuated and non-actuated position of the Retractable Cutter 100 as one example of various embodiments of the present invention. The Thrust/Tube Plunger 110 is positioned within a smaller and non-threaded orifice of the Top Retainer 111. In the OFF (non-actuated) position, the Thrust/Tube Plunger 110 is extended upward from the Top Retainer 111, preferably around 0.420". In the ON position, it is extended preferably 0.150". The extension range for the ON position can be from to 0.800", and for the ON position from 0.050" to 0.050", depending on the design, size, and materials used. The Thrust/Tube Plunger 110 can have different shapes (square, rectangular, triangular, oval etc.) accommodating a matching design of the Top Retainer 111. Also, additional modification of the Thrust/Tube Plunger 110 is possible, such as drilling, knurling, pressing, gluing, forming, turning, etc., to accommodate the Retractable Cutter 100 attachments to different objects (elements) e.g. lanyards, reels, cords, pockets, desks, tables, instruments, and other places suitable for attachment.

Figure 5:
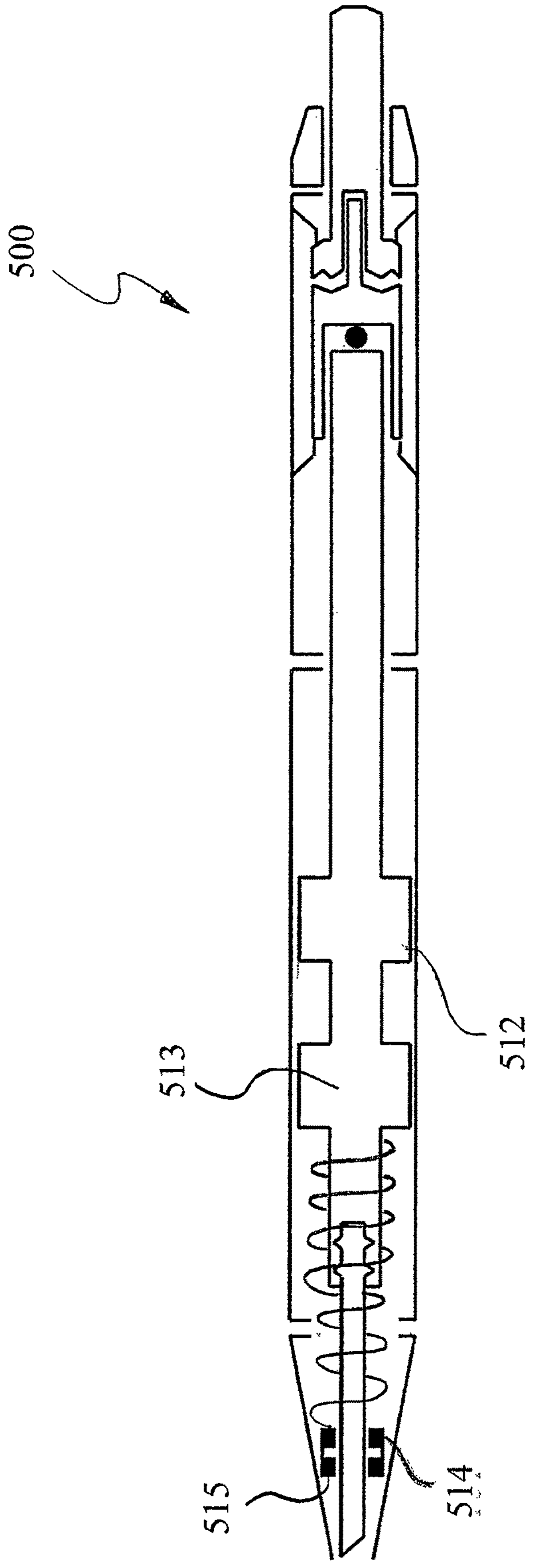
FIG. 5 shows an alternative embodiment in non-actuated position with additional slip contact point on the cam/piston cartridge and blade guide.

FIG. 5 shows an alternative embodiment of the retractable cutter. The retractable cutter mostly has the same parts as the retractable cutter 100 from FIG. 1, except, the Blade Guide includes Additional Slip Contacts 514 and the Cam-Piston Cartridge includes Additional Slip Contacts 513. Additionally, the Cam-Piston Additional Slip Contacts 512 and Blade Guide Additional Slip Contacts 515 improve radial cutting stability of the Blade 103 (FIG. 1) and Cam-Piston Cartridge 104 (FIG. 1). These elements with additional slip contacts 512, 513, 514 and 515 reduce a possible flexing of the Blade 103 (FIG. 1) during the cutting operation. This reduction in flexing, in turn, increases the blade life and provides improved cutting precision by minimizing a gap tolerance between the Blade 103 (FIG. 1) and Blade Guide with Additional Slip Contacts 514, and between the Cam-Piston Cartridge with Additional Slip Contacts 513 and Lower Piston Casing 106 (FIG. 1). The Cam-Piston Additional Slip Contacts 512 are preferably integrated protrusions of the Cam-Piston Cartridge with Additional Slip Contacts 513 made of the same material. Protrusions can be made of different materials, such as metal, fiberglass, Teflon, plastic and any other low friction materials. If protrusions are made of different materials, methods for attachment can include welding, pressing, gluing, affixing and other ways of attaching to the Cam-Piston Cartridge with Additional Slip Contacts 513. The number of protrusions can preferably vary from 2 to 10. The preferred width of each protrusion is 0.250", but the range can include widths from 0.050" to 0.500". The preferred gap for the slip contact between the outer surface of the protrusion and the inner surface of the Lower Piston Casing 106 (FIG. 1) is 0.002". If needed due to the design and materials used, the gap can vary up to 0.005". To further minimize any friction between the protrusions and inner surface of the Lower Piston Casing 106 (FIG. 1), the outer surface of the protrusions can be oval, round or have any different shape that provides less contact surface. The Cam-Piston Cartridge with Additional Slip Contacts 514 can be integrated with the Bottom Retainer 102 (FIG. 1) or provided as an insert made of plastic, fiberglass, metal, glass, and other low friction materials. The preferred material for the Cam-Piston Cartridge with Additional Slip contacts 514 is carbon steel with low hardness. In a preferred embodiment, there are 2 flat-slip contact points, each having a width of 0.025" with 0.025" space between them. These slip contacts are connected with an integrated outer shell. The number of the slip contacts can range from 2 to 10. The width of the contacts can range from 0.015" to 0.050". In any case, the overall length cannot exceed 0.400" and must fit into the Bottom Retainer 102 (FIG. 1).

Figure 6:
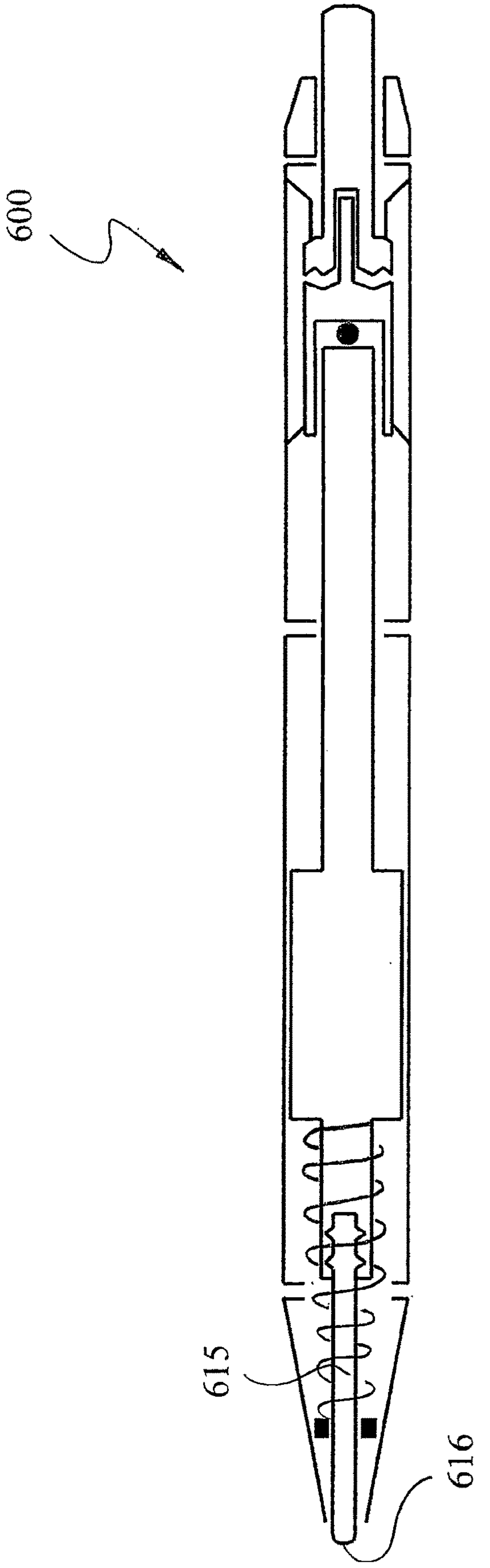
FIG. 6 shows an alternative embodiment in actuated position with a rounded cutting tip of the blade.

FIG. 6 shows an alternative embodiment in the actuated position with a Round Cutting Tip 616 of the Round Blade 615, having the same other parts as the retractable cutter 100. This design improves precision for curved cuts and provides uniform wearing of the Round Blade 615. In a preferred design, the radius of the blade's tip is 0.044", but the radius can range from 0.025" through the size of the opening of the bottom retainer. In a preferred embodiment, the Round Blade 615 is made of high quality tempered carbon steel. Also, the blade can be made of fatigue-resistant 301 spring-tempered stainless steel or other adequate metals or cutting materials such as carbon steel, high speed steel (HSS), cast cobalt alloys, coatings on different materials, cermet, ceramic, alumina, silicon nitride, cubic boron nitrite, ceramic tips, tungsten carbide, titanium carbide, carbide tips, glass, diamond, diamond tipped materials, hard plastic, fiberglass, graphite, and other composite materials. Preferred blade dimensions are: Length=0.800", Width=0.087", Thickness=0.020". Dimensions can differ to accommodate different casings. Preferred dimensional ranges for the blade are: thickness (0.015" to 0.035")—this will give the blade adequate rigidity and manufacturability for automated sharpening; length: (from 0.500" to the entire length of the casing); width (0.050" to the size of the opening of the bottom retainer)—larger blade width may increase performance when piercing and cutting the thicker materials. A preferred blade cutting tip is 0.044" with a standard sharpening angle for the thickness. The tip can have a different oval shape with multiple radiuses and cutting angles.

Figure 7:
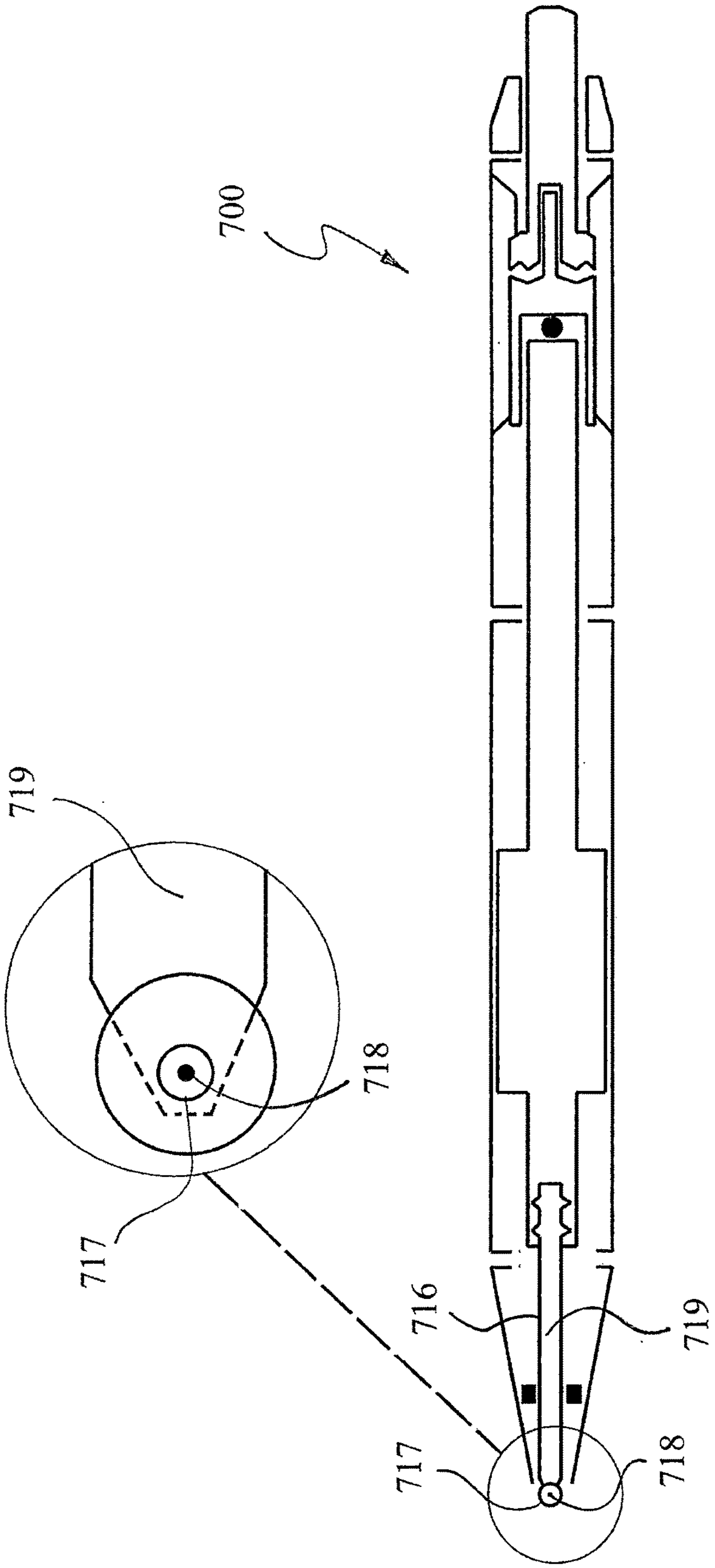
FIG. 7 shows an alternative embodiment in actuated position with a circular tip of the blade assembly.

FIG. 7 shows an alternative embodiment in the actuated position with a Circular Blade Assembly 716 comprised of Circular Blade 717, Circular Blade Shaft 718, and Anchoring Part of Circular Blade Assembly 719 having other parts the same as the retractable cutter 100. The same materials as in the preferred design of the Retractable cutter 100 can be used. This embodiment has the Circular Blade 717 with smoothly sharpened edges on both sides and a circular opening in the middle for the placement of the Circular Blade Shaft 718. The Circular Blade Shaft 718 is used to connect the Circular Blade 717 to the Anchoring Part of the Circular Blade Assembly 719 to form the Circular Blade Assembly 716. Preferred diameter of the Circular Blade 717 is 0.088" with a dimensional range from 0.025" through the size of the opening of the Bottom Retainer 102 (FIG. 1). The inner centered opening diameter of the Circular Blade 717 in a preferred design is 0.030", with a dimensional range from 0.020" through 0.040", depending on the materials and design used. The Anchoring Part of the Circular Blade Assembly 719, on the side where the Circular Blade 717 is connected, has the same size opening as the Circular Blade 717 to accommodate placement of the solid Circular Blade Shaft 718. The shaft material can be metal, plastic, or other compounds adequate for high friction rotation application. A preferred diameter of the Circular Blade Shaft 718 is 0.028", with a dimensional range from through 0.038". A preferred clearance between the Circular Blade Shaft 718 and inner openings of the Circular Blade 717 and the Anchoring Part of the Circular Blade Assembly 719 is 0.002", with a dimensional range from 0.001" through 0.005". This design allows easy cutting of the round contours with great accuracy.

Figure 8:
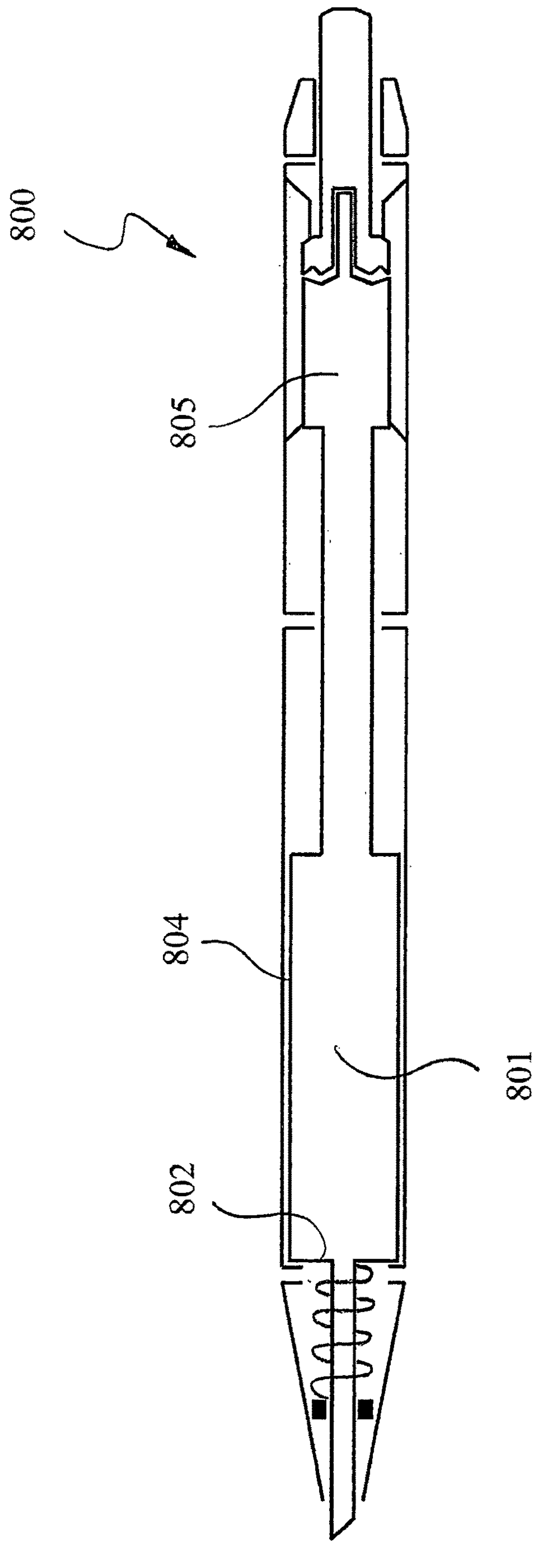
FIG. 8 shows an alternative embodiment in actuated position with a solid blade cam piston cartridge.

FIG. 8 shows an alternative embodiment in the actuated position with a Solid Blade Cam Piston-Piston Cartridge 801 having other parts, design and material options just like the Retractable Cutter 100 except the Solid Blade Cam Piston-Piston Cartridge 801. In special applications, such as surgical rooms, labs, intensive care units, “clean rooms” for scientific research, etc., it may be required that the entire retractable cutter can be disinfected by heat, UV, microwave, alcohol and other disinfectant substances. In that case, all elements and assemblies of the retractable cutter should be made of, preferably, stainless steel 300 Series Austenitic-Typical Grade: 304 Chromium (17-25%); nonmagnetic, not heat treatable, or other nonporous heat resistant metals. One of the design examples for this purpose is presented in FIG. 8 assembly 800 where the Solid Blade Cam Piston-Piston Cartridge 801 is made in one piece. The method for making this part can include machining, wire EDM, 3D metal printing, casting, metal spinning and other way of molding or machining metal parts. The integrated Solid Blade Cam Piston-Piston Cartridge 801 is a one piece design accommodating a Lower Shoulder Rest 802 for spring nesting, a slip contact surface between a Lower Protrusion 804 and a Lower Piston Casing 106 (FIG. 1), a slip contact between the Thrust Device Protrusion 805 cams with and longitudinal cam groves of the Actuation Cylinder 107 (FIG. 1), and free movement contact with the Thrust/Tube Plunger 110 (FIG. 1). Tolerance, dimensions, number of protrusions, and other mechanical and material characteristics are the same as in the Retractable Cutter 100.

Figure 9:
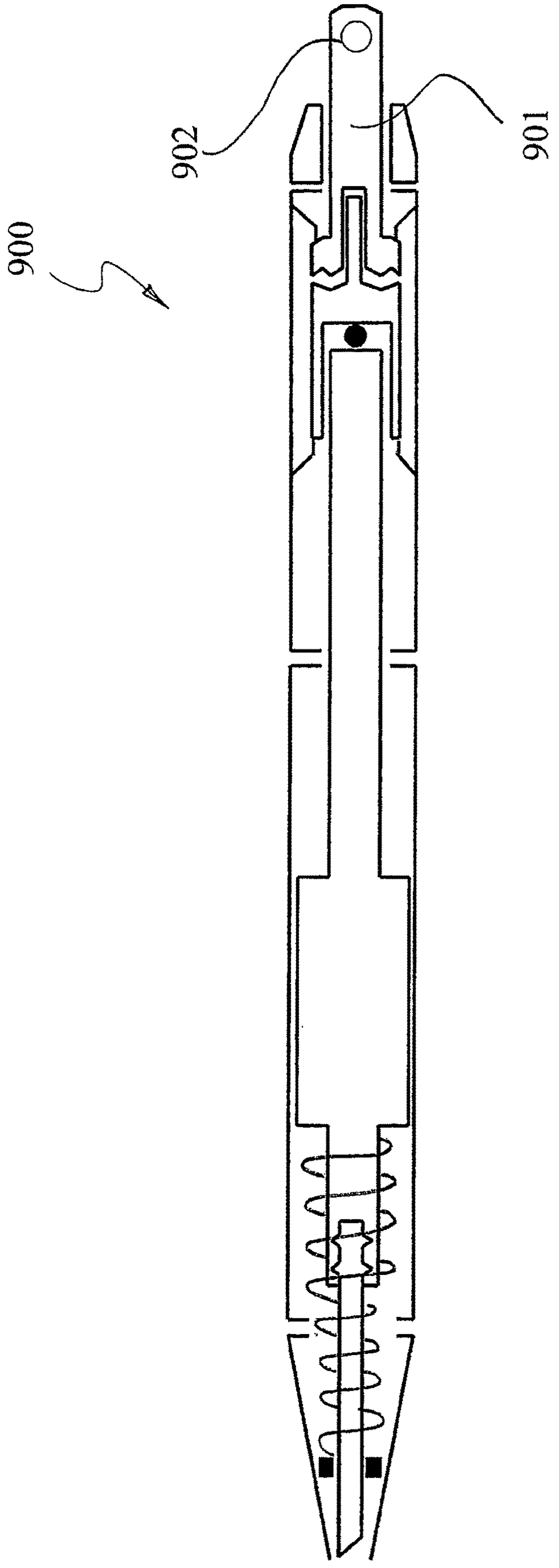
FIG. 9 shows an alternative embodiment in non-actuated position with a hollowed thrust tube/plunger.

FIG. 9 shows an alternative embodiment in a non-actuated position with a Hollowed Thrust Tube/Plunger 901, having other parts, their design, dimensions and material options the same as the Retractable Cutter 100. Preferably, the Thrust Tube/Plunger Opening 902 dimension is 0.040" in diameter and is positioned radially on the top side of the Hollowed Thrust Tube/Plunger 901 with enough clearance to prevent interference with the Top Retainer 111 (FIG. 1). A range of the opening is from 0.020" to 0.100" and depends on the design and materials used. This alternative embodiment allows attachment of the Retractable Cutter 100 to the clothing, pockets, retractable reels, desks, monitors, carts etc.

Figure 10:
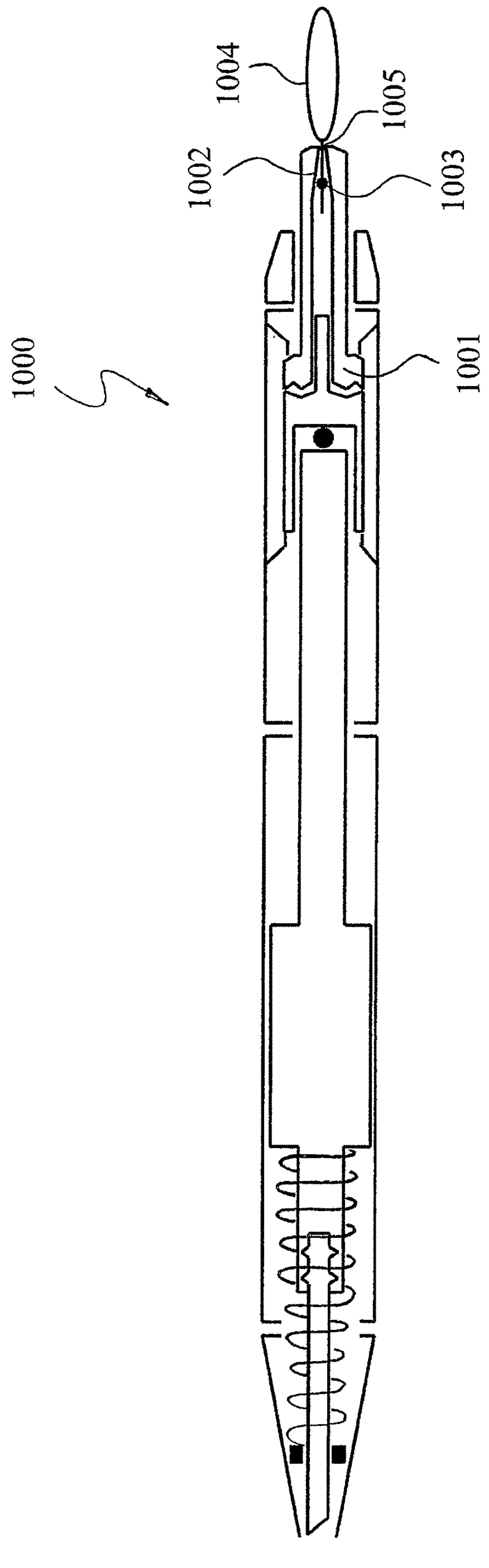
FIG. 10 shows an alternative embodiment in non-actuated position with a looped thrust tube/plunger.

FIG. 10 shows an alternative embodiment in a non-actuated position with a Looped Thrust Tube/Plunger 1001 encompassing a Loop 1004, having other parts, their design, dimensions, and material options the same as the Retractable Cutter 100. The loop 1004 is used for safe and secure attachment to the pockets, retractable reels, desks, computer, instruments and other objects needed for easy and safe access to the Retractable Cutter 100. The loop 1004 is protruding from the Top Opening 1005 of the Looped Thrust Tube/Plunger 1001. A preferred shape of the opening is a circle, with a diameter of 0.060" to accommodate insertion of the doubled string of the Loop 1004. Other shapes can be used e.g. oval, triangular, square etc. Preferably, a string is made of 0.020" Nylon waxed braided rope with minimum tensile strength of 14 PSI. This material will ensure softness and easy handling during the ON/OFF sequencing. Non-waxed rope can also be used. A preferred protrusion length of the Loop 1004 outside of the Thrust Tube/Plunger 1001 is 1.000", but the length can vary from 0.500" to 3.000 depending on the need for attachment to different objects. The loop 1004 can be made of different material such as Kevlar, plastic, PVS, stainless steel, silk etc., with thickness ranging from 0.010" to 0.080". Use of different thickness for the Loop 1004 will require a different size of the Top Opening 1005 ranging from 0.030" to 0.200". In a preferred design, the Looped Thrust Tube/Plunger 1001 has cam protrusions for the radial movement in the slip contact with cam protrusions of the Actuation Cylinder 107 (FIG. 10). In a preferred design, the Looped Thrust Tube/Plunge 1001 has a round bottom opening of with a depth of the opening of 0.447", and a Tapered Ending 1002 at the inner top, with a decreasing opening from 0.139" to 0.060". The preferred range for the round opening is from to 0.300", depending on the casing design and material used. The preferred range for the depth of the opening is between 0.350" through 1.000" depending on the casing design and materials used. This preferred depth range will ensure internal spacing between the top portion of the Thrust Device 109 (FIG. 1) and the inner Tapered Ending 1002 of the Looped Thrust Tube/Plunger 1001. This spacing is needed to accommodate a Loop Anchor 1003 for nesting and secure connection of the Loop 1004 inside of the Looped Thrust Tube/Plunger 1001. In a preferred design, the Loop Anchor 1003 is made of the same string or rope used for the Loop 1004 by tying double knots and burning ends for elimination of untying. Softness of the Loop 1004 materials will ensure nesting inside of the Looped Thrust Tube I Plunge 1001 clinging into tapered section when pulled outward during the assembly. Other methods can be used to secure the Loop 1004 inside the Looped Thrust Tube I Plunge 1001 such as clamps, rivets, glue, welding, etc. In a preferred design, the material used for the Looped Thrust Tube/Plunger 1001 is plastic, but other materials can be used such as metal, fiberglass, powder molded parts, 3D modeled parts, castings, glass, ceramic and other wear resistant materials.

Figure 11:
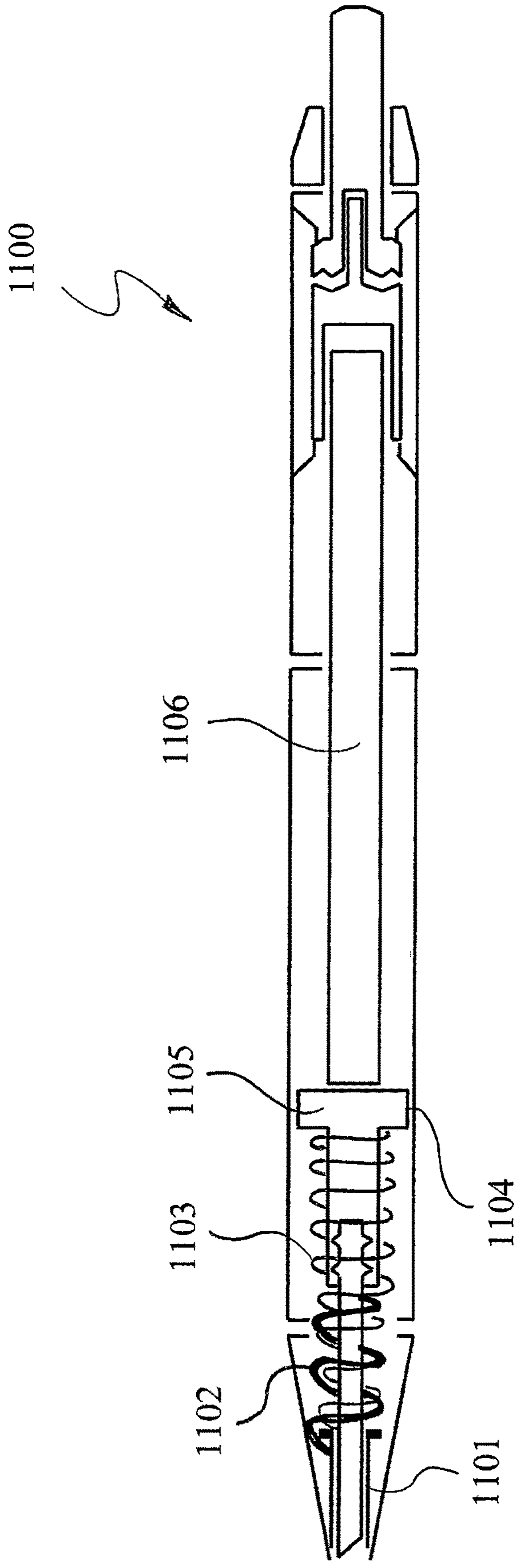
FIG. 11 shows an alternative embodiment in non-actuated position with a tubular lip blade guide, blade retaining cam-piston assembly, upper cam piston-bar, tubular retaining spring, and the blade action spring.

FIG. 11 shows an alternative embodiment in the non-actuated position with a Tubular Lip Blade Guide 1101, Blade Retaining Cam-Piston Assembly 1104, Upper Cam-Piston Bar 1106, Tubular Retaining Spring 1102, and the Blade Action Spring 1103, having the same other parts as the Retractable Cutter 100, except a removed Friction Element 108 (FIG. 1). This design improves radial cutting stability of the Blade 103 (FIG. 1) and allows cost effective blade replacement. The removed Friction Element 108 (FIG. 1) permits free axial movement and manual alignment of the Blade Retaining Cam-Piston Assembly 1104. The tubular Lip Blade Guide 1101 has a cylindrical shape with a lip protrusion on the side contacting the Blade Action Spring 1103. On the opposite side, it rests close to the orifice of the Bottom Retainer 102 (FIG. 1). The tubular Lip Blade Guide 1101 has three functions: a) to reduce axial movement of the Blade Retaining Cam-Piston Assembly 1104 during cutting operation, b) to allow precise positioning of the Tubular Retaining Spring 1102, and c) to provide physical resting support for the Blade Action Spring 1103. The preferred outside diameter of the tube section is between 0.130" and most preferably 0.130". Outside diameter of the tube section is preferably at least larger than the diameter of the orifice of the Bottom Retainer 102 (FIG. 1) to minimize the possibility of a protrusion out of the Bottom Retainer 102 (FIG. 1). Outside diameter should accommodate placement of the Tubular Retaining Spring 1102 form outside of the guide. The preferred length is 0.345", but it can range from 0.100" to 0.500". A preferred outside diameter of the lip is 0.150", but it can range from 0.140" to 0.250". A preferred lip thickness is the thickness of the material used for the tubing, but it can go up to 0.100". A preferred inside diameter is 0.110", but the range includes diameters from 0.100" to 0.150". A preferred material is aluminum, but other material can be used such as stainless steel, plastic, copper, brass, glass, and other height strength and abrasion resistance materials. The Blade Retaining Cam-Piston Assembly 1104 includes a Blade 103 (FIG. 1), and a Cam-Piston Retainer 1105. The Blade 103 (FIG. 1) is affixed to the Cam-Piston Retainer 1105. Preferably, the Blade 103 is insert-molded to the plastic Cam-Piston Retainer 1105. Other means of anchoring the Blade 103 to the Cam-Piston Retainer 1105 include riveting, welding, plastic welding, gluing, compression bonding, press fit, UV bonding, screwing, mechanical rivets, bolts, threaded inserts, self-clinching fasteners, adhesive bonding, and other available methods. This can be accomplished with numerous methods such as: machining, insert molding, rotary casting, 3D printing, stamping, molding, cutting, laser cutting, CNC turning, Wire EDM machining, plating, and other available techniques. For plastic design, preferred methods are 3D printing, multi cavity molding, injection molding, transfer molding, plastic bonding, insert molding, rotary molding and other techniques. For metal design, composites, fiberglass, glass, and carbide, preferred manufacturing processes are machining, grinding, casting, molding, rotary casting, stamping, and casting power metal. Preferably, the Cam-Piston Retainer 1105 is made of Acetal Resin with most preferable overall length of approximately 1.562", allowing a blade 103 exposure of approximately 0.300". An overall length of the Cam-Piston Retainer 1105 can range from 1.000" to 2.500", depending on the casing design and material. The Blade protraction from the Cam-Piston Retainer 1105 can be in a range from 0.100" to 1.000", depending on the casing design and materials used.

The Blade can be also made of metal, ceramic, plastic, plastic tubing, brass, brass tubing, glass, fiberglass, wood, and other suitable materials. All above designs can be made by a variety of manufacturing processes and procedures including turning, stamping, injection molding, powder metal casting, 3D printing, cutting, forging, transfer molding, welding, etc.

The Cam-Piston Retainer 1105 largest outside diameter is most preferably approximately 0.230", thereby allowing close sliding contact with the lower piston's casing 106 (FIG. 1) inside diameter. The sliding contact points between the Cam-Piston Retainer 1105 and Lower Piston Casing 106 (FIG. 1), as well as the Blade 103 (FIG. 1) and Tubular Lip Blade Guide 1101, provide a linear stability of the Blade Retaining Cam Piston Assembly 1104 during its upward and downward motion.

Most preferably, the Upper Cam-Piston Bar 1106 is made of Acetal Resin with an overall length of approximately 1.546", and a diameter of approximately 0.190". The overall length can preferably range from 1.000" to 2.500", and the diameter can preferably range from 0.100" to 0.335". A contact with the Blade Retaining Cam-Piston Assembly 1104 is a slip-contact, and a contact with the Trust Device 109 (FIG. 1) is also a slip-contact on the surface or inside cavity of the Trust Device 109 (FIG. 1). Protrusions can be made of different materials, such as metal, fiberglass, Teflon, plastic and any other low or high friction materials.

The tubular Retaining Spring 1102 is preferably a compression spring, also known as coil or helical spring. By overlapping the Tubular Lip Blade Guide 1101, the spring 1102 provides additional guide stability during operation. On the lower side, it rests on the inner surface of the Bottom Retainer 102 (FIG. 1). The most preferred length is approximately 0.750" with the most preferable outside diameter 0.218". The preferred length can range from 0.300" to 1.250" depending on design and material used. The most preferred number of coils is 10. The number of coils can range from 5 to 20. The outside diameter preferably ranges from 0.100" to 0.300". The most preferred wire diameter is approximately 0.016". The wire diameter can preferably range from 0.010" to 0.030". While standard metal spring is a preferred design, other materials with spring characteristics can be used, including spring tempered stampings, plastic, rubber, gas cylinders, magnets, etc.

The Blade Action Spring 1103 is preferably a compression spring, also known as coil or helical spring. When the Thrust Tube/Plunger 110 (FIG. 1) is pressed to the ON position, the Thrust Device 109 (FIG. 1) is pushed and the Blade 103 (FIG. 1) is guided via the Blade Retaining Cam Piston Assembly 1104 and Upper Can-Piston Bar 1106, through the Tubular Lip Blade Guide 1101, and partially outside the Bottom Retainer 102 (FIG. 1), thereby exposing the tip of the Blade 103 (FIG. 1) from the housing. In this ON position, the Blade Action Spring 1103 is engaged between the Tubular Lip Blade Guide 1101 and the Blade Retaining Cam Piston Assembly 1104 to provide a spring force that prevents the Blade 103 (FIG. 1) from extending any further. When the Thrust Tube/Plunger 110 (FIG. 1) is pressed to the OFF position, the Thrust Mechanism 109 (FIG. 1) is positioned in such a way to enable the Blade Action Spring 1103 to rebound to its original position, and the Blade 103 (FIG. 1) retracts back into the housing. The rebound force of the spring can be regulated by selecting different spring materials, length, number of loops, diameter, etc. A preferred material for the Blade Action Spring 1103 is tempered carbon steel, but other materials can used such as; plastic, stainless steel, rubber, magnets and any other material which can store potential energy by applying compression pressure and release energy by releasing pressure. The most preferred approximate spring dimensions are: Length=1.414", 00=0.154", 10=0.1126" and Wire thickness=0.013", The most preferred number of coils is 25. The dimension range of the non-compressed Blade Action Spring 1103 depends on (1) a design of the cutter; (2) the materials used for the non-compressed Blade Action Spring 1103 and (3) a desired compression pressure. The spring 1103 preferred approximate ranges are: Length=0.100" to 2.000", 00=0.050" to 0.300", 10=0.050" to 0.280", Wire thickness=0.010" to 0.030". The number of coils can preferably range from 2 to 30. While standard metal spring is a preferred design, other materials with spring characteristics can be used, including spring tempered stampings, plastic, rubber, gas cylinders, magnets, etc.

Figure 12:
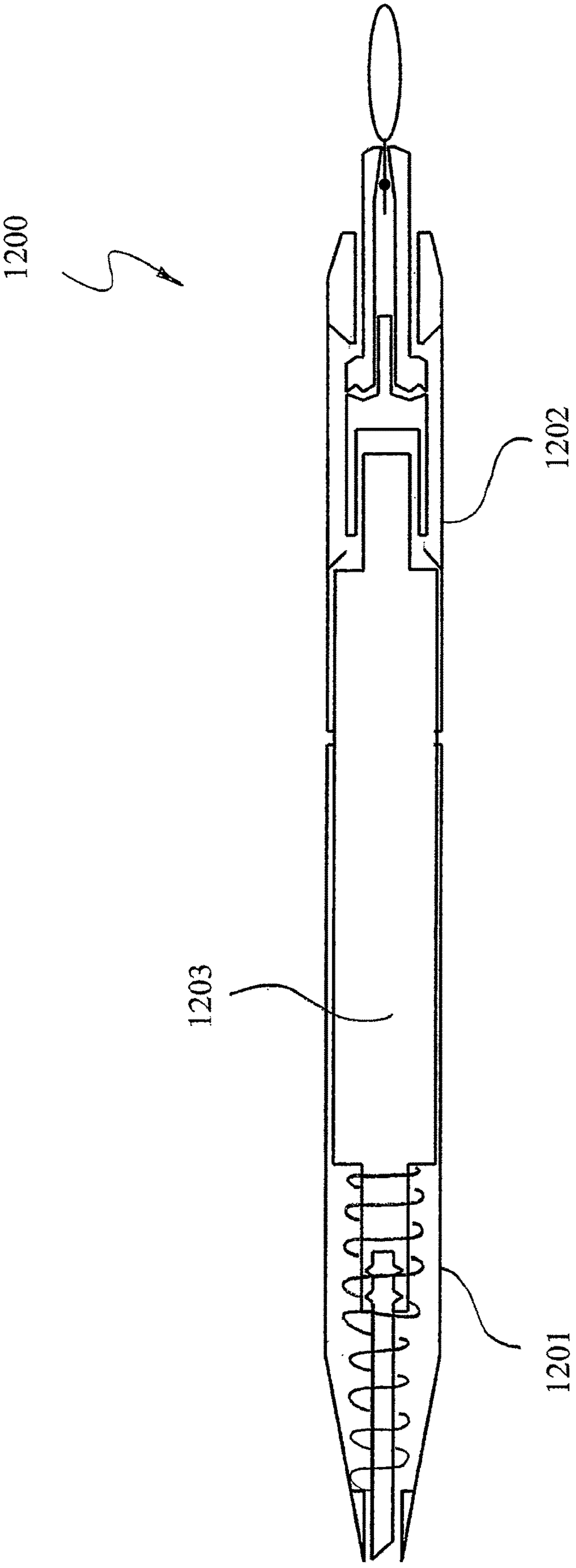
FIG. 12 shows an alternative embodiment in non-actuated position with an integrated lower casing, integrated upper casing, and press fit piston.

FIG. 12 shows an alternative embodiment in a non-actuated position with an Integrated Lower Casing 1201, Integrated Upper Casing 1202, and Press Fit Piston 1203, having other parts, their design, dimensions, and material options the same as the Retractable Cutter 100 and parts, their design, dimensions, and material options the same as the Alternative Embodiment 1000 (FIG. 10).

Preferably, Press Fit Piston 1203 is made of Acetal Resin with overall length of 2.700", allowing blade 103 (FIG. 1) exposure of 0.600". Overall Press Fit Piston 1203 length range can be from 2.000" to 5.000" depending on casing design and material. Overall Blade 103 exposure range can be from 0.100" to 1.000", depending on casing design and material used. Press Fit Piston 1203 can be also made of metal, ceramic, plastic, plastic tubing, brass, brass tubing, glass, fiberglass, wood, and other suitable materials. All above designs can be made by a variety of manufacturing processes and procedures including turning, stamping, injection molding, powder metal casting, 3D printing, cutting, forging, transfer molding, welding, etc. Press Fit Piston 1203 largest outside diameter is 0.240 inches allowing close sliding contact with the Integrated Lower Casing 1201 inside diameter. This sliding contact surface between Press Fit Piston 1203 and Integrated Lower Casing 1201, provide a linear stability of the Blade 103 during upward and downward motion. Preferably, Press Fit Piston 1203 has a lower recessed portion with outside diameter (OD) of 0.176" and length of 0.220" to support and allow free contraction and expansion of the Spring Mechanism 105 (FIG. 1). Lower recess portion outside diameter range can be from 0.050" to 0.500", depending on casing design and material used. Press Fit Piston 1203 preferably has an upper recessed portion with OD of 0.159" and length of 0.175". A preferred OD of accommodates press fit to the Thrust Device 109 (FIG. 1). Upper recessed portion OD range can be from 0.050" to 0.500", depending on casing design and material used.

The Blade 103 (FIG. 1) is affixed to the Press Fit Piston 1203. Preferably, Blade 103 is insert-molded to the plastic Press Fit Piston 1203. Other means of anchoring the Blade 103 to the Press Fit Piston 1203 include riveting, welding, plastic welding, gluing, compression bonding, press fit, UV bonding, screwing, mechanical rivets, bolts, threaded inserts, self-clinching fasteners, adhesive bonding, and other available methods. This can be accomplished with numerous methods such as: machining, insert molding, rotary casting, 3D printing, stamping, molding, cutting, laser cutting, CNC turning, Wire EDM machining, plating, and other available techniques. For plastic design, preferred methods are 3D printing, multi cavity molding, injection molding, transfer molding, plastic bonding, insert molding, rotary molding and other techniques. For metal design, composites, fiberglass, glass, and carbide, preferred manufacturing processes are machining, grinding, casting, molding, rotary casting, stamping, and casting power metal. Preferably, Blade 103 has two protrusions 112 on each side of the dull end opposite to the cutting edge, for adequate anchoring to the Press Fit Piston 1203 during insert molding process. Protrusions are preferably triangular in shape with 0.020" sides. Dependent on design, the number of the anchoring protrusions can vary from 1 to 10. Protrusions can be replaced with holes on the body of the blade or other means of anchoring to the Press Fit Piston 1203. Also, Blade 103 can be insert-molded without any anchoring elements with a proper surface preparation such as knurling, threading, sand blasting, etching etc. Blade 103 connection to the Press Fit Piston 1203 can be accomplished by other means, e.g., glued, welded, fastened with fasteners known in the art, etc. Blade protraction from Press Fit Piston 1203 can be in a range from 0.100" to 1.000", depending on the casing design and materials used.

Integrated Lower Casing 1201 is a single housing unit providing linear and rotational guide for the Blade 101 (FIG. 1), chamber for the Spring Mechanism 105 (FIG. 1), and slip-low friction contact with Pres Fit Piston 1203. Blade guide inner protrusion is a lower integrated portion of Integrated Lower Casing 1201 by the blade opening orifice. Its function is to accommodate blade width allowing free linear and rotational movement of the blade. Preferred inside diameter (ID) of the blade guide is 0.110".

The range of an inside diameter of the blade guide inner protrusion depends on the width of the Blade 103 (FIG. 1) and it can range from 0.029" to 0.300". Upper edge and surface of the blade guide inner protrusion is providing secure resting of the Spring Mechanism 105 (FIG. 1). Upper edge of the blade guide is preferable located 0.200" from lower edge of the Integrated Lower Casing 1201. Location range of the upper edge of the blade guide can be from 0.050" to 0.500", depending on the casing design and materials used. Inside diameter accommodating Press Fit Piston 1203 preferably has ID of 0.260". ID range can be from 0.100" to 0.500", depending on the casing design and materials used.

Integrated Lower Casing 1201 is preferably made of moldable plastic with or without coating. Other materials can be used such as metals, ceramics, glass, fiberglass, etc.

Integrated Lower Casing 1201 preferably has male threads on the upper side, allowing firm connection to the Integrated Upper Casing 1202. Other connections to Integrated Upper Casing 1202 can be used including but not limited to gluing, riveting, bonding, pinching, pressing, welding, brazing, etc.

Integrated Upper Casing 1202 preferably has female threads on the lower side engaging the Integrated Lower Casing 1201. Integrated Upper Casing 1202 is also preferably made of plastic, but other materials can be used, such as fiberglass, glass, aluminum, bronze, copper alloys, stainless steel, brass, and other metals. The Integrated Upper Casing 1202 has inner protrusion cams providing 120° Press Fit Piston 1203 rotations with every push ON/OFF cycle on the Thrust Tube/Plunger 110 (FIG. 1), engaged through the Thrust Device 109 (FIG. 1). By changing the number of inner protrusions in the Integrated Upper Casing 1202, the number of protrusions and cam design on the Thrust Device 109 and Thrust Tube/Plunger 110, the degree of rotation per click can be modified to 30°, 45°, 60°, and 180°. Inside diameter accommodating Press Fit Piston 1203 preferably has 10 of 0.260". 10 range can be from 0.100" to 0.500", depending on the casing design and materials used.

One Example of Intended Use

The present invention and novel tool can be a desirable part of the gear for nurses and medical personnel. During their work, the need for cutting and opening a variety of bags, blister packs, pill packs, tapes, etc. is constant. Some attempts are made to design and provide medical personal with proper tools for these needs, but most available products are hard to work with, they are not safe, they are not universal for multiple applications, they lack necessary design and materials for appropriate disinfection, they cannot be attached to ID holders or carriers, and cannot be attached to key chains or stationary equipment, etc.

ITEM LIST

101 Blade Guide
102 Bottom Retainer
103 Blade
104 Cam-Piston Cartridge
105 Spring Mechanism
106 Lower Piston Casing
107 Actuation Cylinder
108 Friction Element
109 Thrust Device
110 Thrust Tube/Plunge
111 Top Retainer
512 Cam-Piston Additional Slip Contacts
513 Cam-Piston Cartridge with Additional Slip Contacts
514 Blade Guide with Additional Slip Contacts
515 Blade Guide Additional Slip Contacts
615 Round Blade
616 Round Cutting Tip
716 Circular Blade Assembly
717 Circular Blade
718 Circular Blade Shaft
719 Anchoring Part of Circular Blade Assembly
801 Solid Blade Cam Piston Cartridge
802 Lower Shoulder Rest
804 Lower Protrusion
805 Thrust Device Protrusion
901 Hollowed Thrust Tube/Plunge

902 Thrust Tube/Plunge Opening
1001 Looped Thrust Tube/Plunge
1002 Tapered Ending
1003 Loop Anchor
1004 Loop
1005 Top Opening
1101 Tubular Lip Blade Guide
1102 Tubular Retaining Spring
1103 Blade Action Spring
1104 Blade Retaining Cam-Piston Assembly
1105 Cam-Piston Retainer
1106 Upper Cam-Piston Bar
1201 Integrated Lower Casing
1202 Integrated Upper Casing
1203 Press Fit Piston Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the specific claims in non-provisional application.

What is claimed is:

1. A retractable cutting device comprising:

a tubular elongate housing including a bottom retainer at a first end thereof and a top retainer at a second end thereof;

a blade assembly disposed longitudinally within the housing, the blade assembly including a blade connected to a first end of a cam piston, a plunger disposed proximate a second end of the cam piston, and a thrust device disposed between the cam piston and the plunger; and a spring mechanism disposed within the housing, and between a blade guide and a lower edge of the cam piston, wherein the blade assembly is movable along a longitudinal axis of the housing between a retracted position and an extended position, and wherein, in a state where the blade assembly is moving from the retracted position to the extended position, the blade is guided, in part, by a slip contact between the blade and the blade guide.

2. The retractable cutting device of claim 1, the bottom retainer including an aperture, and the blade guide, wherein the spring mechanism is retained between the blade guide and the lower edge of the cam piston.

3. The retractable cutting device of claim 2, wherein, in a state where the blade assembly is in the extended position, the blade extends outward from the aperture of the bottom retainer, and in a state where the blade assembly is in the retracted position, the blade is disposed within the bottom retainer.

4. The retractable cutting device of claim 3, wherein, in a state where the blade assembly is in the extended position, the spring mechanism applies a biasing force against the lower edge of the cam piston, and the distance that the blade extends outward from the aperture is limited by the biasing force.

5. The retractable cutting device of claim 3, wherein, in a state where the blade assembly is moving from the retracted position to the extended position, the cam piston is guided, in part, by a slip contact between an outer surface of the cam piston and an inner wall of a piston casing of the housing.

6. The retractable cutting device of claim 3, wherein, in a state where the blade assembly is moving from the retracted position to the extended position, the thrust device is guided, in part, by a slip contact between an outer surface of the thrust device and an inner wall of an actuation cylinder of the housing.

* * * * *